United States Patent
Wang et al.

(10) Patent No.: US 10,416,779 B2
(45) Date of Patent: Sep. 17, 2019

(54) INPUT DEVICE AND INPUT METHOD

(71) Applicant: BOE TECHNOLOGY GROUP CO., LTD., Beijing (CN)

(72) Inventors: Xin'an Wang, Beijing (CN); Jiantao Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/104,514

(22) PCT Filed: Oct. 15, 2015

(86) PCT No.: PCT/CN2015/091968
§ 371 (c)(1),
(2) Date: Jun. 14, 2016

(87) PCT Pub. No.: WO2016/201834
PCT Pub. Date: Dec. 22, 2016

(65) Prior Publication Data
US 2018/0088683 A1     Mar. 29, 2018

(30) Foreign Application Priority Data
Jun. 19, 2015   (CN) .......................... 2015 1 0347653

(51) Int. Cl.
*G06F 3/02*     (2006.01)
*H01H 13/83*    (2006.01)
(Continued)

(52) U.S. Cl.
CPC .............. *G06F 3/0202* (2013.01); *G06F 3/02* (2013.01); *H01H 13/83* (2013.01);
(Continued)

(58) Field of Classification Search
CPC ...... G06F 3/0202; G06F 3/02; G06F 3/04886; H05B 37/0227; H05B 37/0218; H01H 13/83; H01H 2221/07
See application file for complete search history.

(56) References Cited

U.S. PATENT DOCUMENTS

| | | | |
|---|---|---|---|
| 2005/0275632 A1 | 12/2005 | Pu et al. | |
| 2011/0078613 A1 | 3/2011 | Bangalore | |

(Continued)

FOREIGN PATENT DOCUMENTS

| | | | |
|---|---|---|---|
| CN | 1216128 A | 5/1999 | |
| CN | 1626030 A | 6/2005 | |

(Continued)

OTHER PUBLICATIONS

China Second Office Action, Application No. 201510347653.1, dated Feb. 27, 2018, 20 pps.: with English translation.
(Continued)

*Primary Examiner* — Abhishek Sarma
(74) *Attorney, Agent, or Firm* — Armstrong Teasdale LLP

(57) ABSTRACT

An input device includes at least one light emitting key and a sensing device corresponding to the light emitting key. The sensing device is operable to sense a tapping frequency corresponding to the at least one light emitting key, and to send the tapping frequency to a data processing device. The data processing device is operable to generate a corresponding color control signal according to the tapping frequency, and the at least one light emitting key is operable to emit light according to the color control signal.

16 Claims, 4 Drawing Sheets

(51) Int. Cl.
*H05B 37/02* (2006.01)
*G06F 3/0488* (2013.01)

(52) U.S. Cl.
CPC ..... *H05B 37/0218* (2013.01); *H05B 37/0227* (2013.01); *G06F 3/04886* (2013.01); *H01H 2221/07* (2013.01)

(56) References Cited

U.S. PATENT DOCUMENTS

| | | | |
|---|---|---|---|
| 2012/0229389 | A1 | 9/2012 | Nishino |
| 2013/0111403 | A1 | 5/2013 | Nakamura |
| 2014/0237413 | A1* | 8/2014 | Markiewicz ........ G06F 3/04886 715/773 |
| 2016/0100465 | A1* | 4/2016 | Prescott .................. A63F 13/22 345/170 |

FOREIGN PATENT DOCUMENTS

| | | |
|---|---|---|
| CN | 2906728 Y | 5/2007 |
| CN | 101739138 A | 6/2010 |
| CN | 103019390 A | 4/2013 |
| CN | 104517770 A | 4/2015 |
| CN | 104898859 A | 9/2015 |
| CN | 204679965 U | 9/2015 |
| KR | 20120055506 A | 5/2012 |

OTHER PUBLICATIONS

A Chinese language International Search Report, dated Jun. 19, 2015, for PCT/CN2015/091968.
English translation of PCT (CN) International Search Report, Application No. PCT/CN2015/091968, dated Mar. 21, 2016, 2 pps.
PCT (CN) Written Opinion, Application No. PCT/CN2015/091968, dated Mar. 21, 2016, 6 pps.: with Englsh translation.
China First Office Action, Application No. 201510347653.1, dated Apr. 3, 2013, 19 pps.: with English translation.
European Extended Search Report, Application No. 15866378.1, dated Jan. 24, 2019, 8 pps.

* cited by examiner

INPUT DEVICE AND INPUT METHOD

CROSS REFERENCE TO RELATED APPLICATIONS

This application is a National Stage Entry of PCT/CN2015/091968 filed Oct. 15, 2015, which claims the benefit and priority of Chinese Patent Application No. 201510347653.1 filed Jun. 19, 2015. The entire disclosure of each of the above applications is incorporated herein by reference.

BACKGROUND

Embodiments of the present disclosure relate to an input device and an input method.

Driven by the domestic game market, and in order to satisfy more and higher player demands, keyboard developers have developed backlit keyboards. The backlit keyboard is mainly embodied in emitting light on the keys or panel of the keyboard, so that the alphabets on the keys can be clearly seen even when no light is on at night.

The current backlit keyboard merely emits light. However, the prior art does not have a light emitting keyboard that can indicate a health state to the user.

BRIEF DESCRIPTION

Embodiments of the present disclosure provide an input device and an input method, such that the input device realizes indicating a health state to the user.

Embodiments of the present application provide an input device, including at least one light emitting key and a sensing device corresponding to the light emitting key.

The sensing device is operable to sense a tapping frequency corresponding to the light emitting key, and to send the tapping frequency to a data processing device. The data processing device is operable to generate a corresponding color control signal according to the tapping frequency.

The light emitting key is operable to emit light according to the color control signal.

In some embodiments, the at least one light emitting key is a plurality of light emitting keys, the sensing device is a plurality of sensing devices, and the plurality of light emitting keys are in a one-to-one correspondence with the plurality of sensing devices, such that each sensing device is used to sense a tapping frequency corresponding to one light emitting key.

In some embodiments, the at least one light emitting key is a plurality of light emitting keys, and the sensing device is one sensing device that corresponds to all the light emitting keys, such that the one sensing device is operable to sense a tapping frequency of each of the light emitting keys.

In some embodiments, the sensing device is a plurality of sensing devices, and each sensing device corresponds to a sensing region, each sensing region comprising a plurality of light emitting keys.

In some embodiments, the sensing device is operable to sense a tapping frequency of the corresponding sensing region, the tapping frequency corresponding to each light emitting key in the sensing region.

In some embodiments, the sensing device is operable to count the number of tapping times of the sensing region, to calculate an average value of the number of tapping times of each light emitting key according to the number of tapping times of the sensing region and the number of light emitting keys in the sensing region, and to generate a tapping frequency of the sensing region according to the average value of the number of tapping times.

In some embodiments, the data processing device is operable to look up the color control signal corresponding to the tapping frequency from a preset first mapping relationship table, the first mapping relationship table comprising a correspondence relationship of the tapping frequency and the color control signal.

In some embodiments, the input device further includes a light sensing device.

In some embodiments, the light sensing device is operable to sense the ambient light to obtain a light intensity of the ambient light, and to send the light intensity of the ambient light to the data processing device. The data processing device is operable to generate a corresponding light intensity control signal according to the light intensity of the ambient light.

In some embodiments, the light emitting key is operable to emit light according to the color control signal and the light intensity control signal.

In some embodiments, the data processing device is operable to look up the light intensity control signal corresponding to the light intensity of the ambient light from a preset second mapping relationship table. The second mapping relationship table includes a correspondence relationship between the light intensity of the ambient light and the light intensity control signal.

In some embodiments, the light emitting key is a physical key, and the input device includes a main structure. The light emitting key is located in the main structure and comprises a key and a light emitting source.

In some embodiments, the light emitting source is under the key, and the surface of the key is provided with a light emitting window, through which the light emitted by the light emitting source is emitted.

In some embodiments, the light emitting source is under or beside the key, and the light emitted by the light emitting source is emitted from a slit adjacent to the key.

In some embodiments, the sensing device is in the main structure and under the key, the sensing device being a tapping sensing device.

In some embodiments, the sensing device is external to the main structure and above the key, the sensing device being an image identification device.

In some embodiments, the data processing device is in the main structure.

In some embodiments, the data processing device is in a computer connected to the input device.

In some embodiments, the light emitting keys are virtual keys.

In some embodiments, one sensing device corresponds to all the light emitting keys, and the sensing device is for sensing a tapping frequency of each of the light emitting keys.

The embodiments of the present application also provide an input method.

In some embodiments, the method includes a sensing device sensing a tapping frequency corresponding to a light emitting key, and sending the tapping frequency to a data processing device.

In some embodiments, the method includes the data processing device generating a corresponding color control signal according to the tapping frequency.

In some embodiments, the method includes the light emitting key emitting light according to the color control signal.

In some embodiments, the data processing device generating a corresponding color control signal according to the tapping frequency includes:

the data processing device looking up the color control signal corresponding to the tapping frequency from a preset first mapping relationship table, the first mapping relationship table including a correspondence relationship between the tapping frequency and the color control signal.

In some embodiments, the method further includes the light sensing device obtaining a light intensity of the ambient light by sensing the ambient light, and sending the light intensity of the ambient light to the data processing device.

In some embodiments, the method includes the data processing device generating a corresponding light intensity signal according to the light intensity of the ambient light.

In some embodiments, the light emitting key emitting light according to the color control signal includes the light emitting keys emitting light according to the color control signal and the light intensity control signal.

In some embodiments, the data processing device generating a corresponding light intensity control signal according to the light intensity of the ambient light comprises the data processing device looking up the light intensity control signal corresponding to the light intensity of the ambient light from a second mapping relationship table, the second mapping relationship table comprising a correspondence relationship between the light intensity of the ambient light and the light intensity control signal.

In the input method and technical solutions of the input device provided by embodiments of the present disclosure, the sensing device senses a tapping frequency corresponding to a light emitting key, and the data processing device generates a corresponding color control signal according to the tapping frequency. The light emitting key emits light according to the color control signal, so that the input device achieves the effect of indicating the tapping frequency by the color control signal, enabling the input device to indicate the health state to the user.

BRIEF DESCRIPTION OF THE DRAWINGS

In order to describe the present disclosure more clearly, in the following will be described briefly the accompanying drawings of embodiments of the present disclosure. Obviously, the accompanying drawings in the following description only relate to some embodiments of the present disclosure, and are not intended to limit the present disclosure.

DETAILED DESCRIPTION

In the following will be described the embodiments of the present disclosure clearly and completely in conjunction with the accompanying drawings. Obviously, the described embodiments are merely some embodiments, not all the embodiments of the present disclosure. Based on the embodiments of the present disclosure, all the other embodiments obtained by those of ordinary skill in the art without paying any creative effort belongs the protection scope of the present disclosure.

Figure 1:
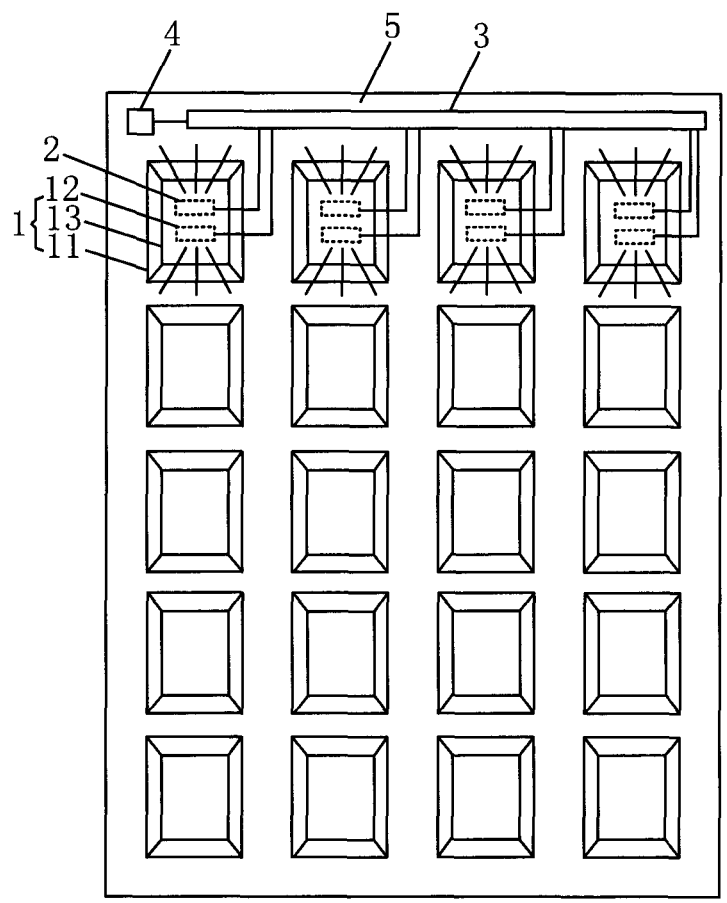
FIG. 1 is a structural schematic view of an input device provided by at least one embodiment of the present disclosure.

FIG. 1 is a structural schematic view of an input device provided by at least one embodiment one of the present disclosure. As shown in FIG. 1, the input device includes at least one light emitting key 1, and a sensing device 2 corresponding to the light emitting key 1.

The sensing device 2 is operable to sense a tapping frequency corresponding to the light emitting key 1, and to send the tapping frequency to a data processing device 3. The data processing device 3 is operable to generate a corresponding color control signal according to the tapping frequency. The light emitting key 1 is operable to emit light according to the color control signal.

In this embodiment, the light emitting key 1 and the sensing device 2 correspond to each other one to one; that is to say, each light emitting key 1 corresponds to one sensing device 2; each sensing device 2 senses a tapping frequency corresponding to one light emitting key 1, and sends the tapping frequency to the data processing device 3 for the data processing device 3 to generate a corresponding color control signal according to the tapping frequency; and each light emitting key 1 may emit light according to the corresponding color control signal. In this embodiment, one sensing device 2 is set for each light emitting key 1, and the sensed tapping frequency is merely for one light emitting key 1, so that each light emitting key 1 corresponds to one color control signal, thus increasing the accuracy of light emission of the light emitting key 1. In some embodiments, the sensing device 2 may be a tapping sensing device, in which case the sensing device 2 may count the number of tapping times and obtain a tapping frequency according to the number of tapping times, and the tapping frequency may be the number of tapping times per second. Specifically, the sensing device 2 may count the number of tapping times and obtain the tapping frequency in real time.

In some implementations, one sensing device may correspond to all the light emitting keys, and the sensing device is for sensing the tapping frequency of each light emitting key. In some implementations, the sensing device may be an image identification device, in which case, the sensing device may count the number of times by identifying the tapping actions of the user, and obtain the tapping frequency according to the number of tapping times, and the tapping frequency may be the number of tapping times per second. Specifically, the sensing device may count the number of tapping times and obtain the tapping frequency in real time. Such a situation is not depicted specifically in the accompanying drawing.

In this embodiment, the data processing device 3 is specifically operable to look up a color control signal corresponding to the tapping frequency from a preset first mapping relationship table, and the first mapping relationship table includes a correspondence relationship between the tapping frequency and the color control signal. In this embodiment, the first relationship table may be set in advance as required, and may be as shown in the following Table 1:

TABLE 1

| Tapping frequency | Color control signal |
| --- | --- |
| larger than or equal to 1/s and less than 2/s | purple control signal |
| larger than or equal to 2/s and less 3/s | blue control signal |
| ... | ... |
| lager than or equal to 5/s | Red control signal |

From the above Table 1, e.g., if the tapping frequency is 1.5/s, the corresponding color control signal is a purple control signal, in which case the corresponding light emitting key 1 emits purple light; when the tapping frequency is 2/s, the corresponding color control signal is a blue control signal, in which case the corresponding light emitting key 1 emits blue light; if the tapping frequency is 5/s, the corresponding color control signal is a red control signal, in which case the corresponding light emitting key 1 emits red light. It can be seen from the above Table 1 that, when the tapping frequency is increased gradually, the color control signal gradually changes from cool color control signals to warm color control signals, realizing a smooth transition from cool color light to warm color light and realizing a tapping heat distribution, thus realizing controlling the color temperature of the light emission of the light emitting keys by the tapping frequency. By observing the above heat distribution, the user can know the tapping frequency, so that the user can reduce the tapping frequency or take a break when the tapping frequency is fast, thus avoiding the condition of over-tiredness of the user when using the input device, realizing indicating the health state to the user. The above Table 1 is merely an example, and the correspondence relationship between the tapping frequency and the color control signal may be set by other rules in practical application, which are not listed one by one here.

Further, the input device may further comprise a light sensing device 4. The light sensing device 4 is operable to sense the ambient light to obtain a light intensity of the ambient light, and to send the light intensity of the ambient light to the data processing unit 3 for the data processing device 3 to generate a corresponding light intensity control signal according to the light intensity of the ambient light; the light emitting key 1 is operable to emit light according to the light intensity of the ambient light and the light intensity control signal. Therein, the data processing device 3 is specifically operable to look up a light intensity control signal corresponding to the ambient light from a preset second mapping relationship table, which includes a correspondence relationship between the light intensity of the ambient light and the light intensity control signal. In this embodiment, the second mapping relationship table may be set in advance as required, and may be as shown in the following Table 2:

TABLE 2

| Light intensity of ambient light | Light intensity control signal |
| --- | --- |
| larger than or equal to 1 standard light intensity value and smaller than 2 times of standard light intensity value | 1.5 times of standard light intensity value |
| larger than or equal to 2 times of standard light intensity value and smaller than 3 times of standard light intensity value | 2.5 times of standard light intensity value |
| ... | ... |
| larger than or equal to 5 times of standard light intensity value | 5.5 times of standard light intensity value |

In the above Table 2, e.g., if the light intensity of the ambient light is 1 standard light intensity value, the corresponding light intensity control signal is 1.5 times of standard light intensity control signal, and the light emitting key 1 adjusts the light emitting intensity to 1.5 times of standard light intensity value according to the 1.5 times of standard light intensity control signal; if the light intensity of the ambient light is 2.8 times of standard light intensity value, the corresponding light intensity control signal is 2.5 times of standard light intensity control signal, and the light emitting key 1 adjusts the light emitting intensity to 2.5 times of standard light intensity value according to the 2.5 times of standard light intensity control signal; if the light intensity of the ambient light is 5 times of standard light intensity value, the corresponding light intensity control signal is 5.5 times of standard light intensity control signal, and the light emitting key 1 adjusts the light emitting intensity to 5.5 times of standard light intensity value according to the 5.5 times of standard light intensity control signal. From the above Table 2, it can be seen that when the light intensity of the ambient light is increased gradually, the light intensity control signal becomes stronger and stronger gradually, thus realizing adjusting the light emitting intensity of the light emitting key 1 according to the ambient light. The above table 2 is merely an example, and the corresponding relationship between the light intensity of the ambient light and the light intensity control signal may be set by other rules in practical applications, which are not listed here one by one.

In this embodiment, the light emitting key 1 is a physical key, and the input device includes a main structure 5, in which the light emitting key 1 is located. The light emitting key 1 may include a key 11 and a light emitting source 12, wherein when the light emitting key 1 emits light according to the color control signal, the light emitting source 12 is operable to emit light according to the color control signal; when the light emitting key 1 emits light according to the color control signal and the light intensity control signal, the light emitting source 12 emits light according to the color control signal and the light intensity control signal. The light emitting source 12 is under the key 11, and the surface of the key 11 is set with a light emitting window 13, through which the light emitted by the light emitting source 12 is emitted.

In some implementations of this embodiment, the data processing device 3 is in the main structure 5. In some implementations of a practical application, the data processing device may also be in a computer connected to the input device, in which case the data processing device may be a micro processor in the computer, and the data processing device may realize connection with the input device by an inherent data channel between the input device and the computer, which data channel may include electric connection lines or wireless transmission systems.

In this embodiment, the sensing device 2 may be in the main structure 5 and under the key 11; in some implementations, the sensing device 2 may be a tapping sensing device. When the user taps the key 11, the sensing device 2 under the key 11 will record the number of tapping times, so as to obtain the tapping frequency according to the number of tapping times.

In some implementations, the sensing device may also be external to the main structure and above the key; in some implementations, the sensing device may be an image identification device. When the user taps the key, the sensing device above the key may record the number of tapping times by identifying the tapping actions of the user, so as to obtain the tapping frequency according to the number of tapping times.

In this embodiment, the light sensing device 4 is above the main structure 5. In some implementations of a practical application, the light sensing device may also be external to the main structure, which is not depicted specifically.

It should be noted that this embodiment only marks the first row of light emitting keys 1 as an example; the other rows of light emitting keys 1 have the same structure as the first row, and are not marked one by one. In addition, since the light emitting source 12 and the sensing device 2 are both under the key 11 in the drawing, they are indicated by dashed lines.

In this embodiment, the input device may include a computer keyboard, a keyboard musical instrument, calculator keys or a virtual keyboard. Therein, the computer keyboard may include a standard computer keyboard, e.g., a standard keyboard with 103 keys, or a non-standard computer keyboard.

In the input device provided by this embodiment, the sensing device senses a tapping frequency corresponding to a light emitting key, and the data processing device generates a corresponding color control signal according to the tapping frequency; the light emitting key emits light according to the color control signal, so that the input device achieves the effect of indicating the tapping frequency by the color control signal, making the input device realize indicating the health state to the user. Meanwhile, each light emitting key emits light according to a color control signal, so that the entire input device forms a comprehensive color light emitting effect, achieving a good visual effect and increasing the interest of tapping. The light emitting keyboard may also adjust the light emitting intensity according to the ambient light, thus facilitating reduction of power consumption.

Figure 2:
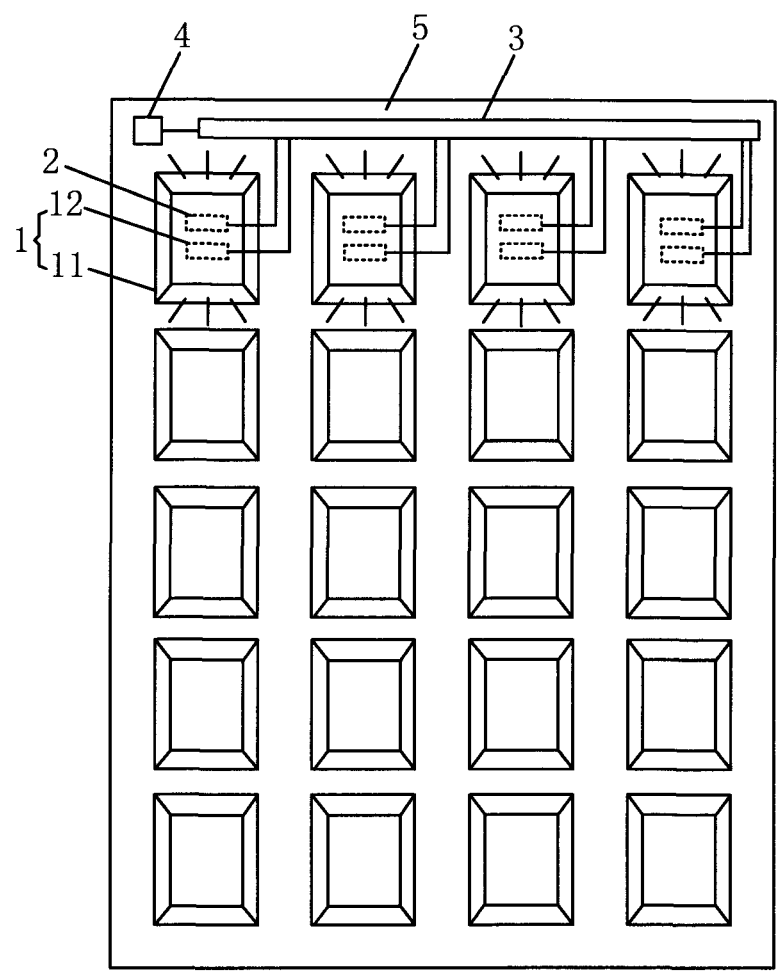
FIG. 2 is a structural schematic view of an input device provided by at least one embodiment of the present disclosure.

FIG. 2 is a structural schematic view of an input device provided by another embodiment of the present disclosure. As shown in FIG. 2, this embodiment and the above embodiment differ in that the light emitting source 12 is under the key 11, and the light emitted by the light emitting source 12 is emitted from a slit adjacent to the key 11. Moreover, the surface of the key in this embodiment is not provided with a light emitting window.

For the description of the other structures in the input device, reference may be made to the above embodiment, and it is not repeated here.

In the input device provided by this embodiment, the sensing device senses a tapping frequency corresponding to a light emitting key, and the data processing device generates a corresponding color control signal according to the tapping frequency; the light emitting key emits light according to the color control signal, so that the input device achieves the effect of indicating the tapping frequency by the color control signal, making the input device realize indicating the health state to the user. Meanwhile, each light emitting key emits light according to the color control signal, so that the entire input device forms a comprehensive color light emitting effect, achieving a good visual effect and increasing the interest of tapping. The light emitting keyboard may further adjust the light emitting intensity according to the ambient light, thus facilitating reduction of power consumption.

Figure 3:
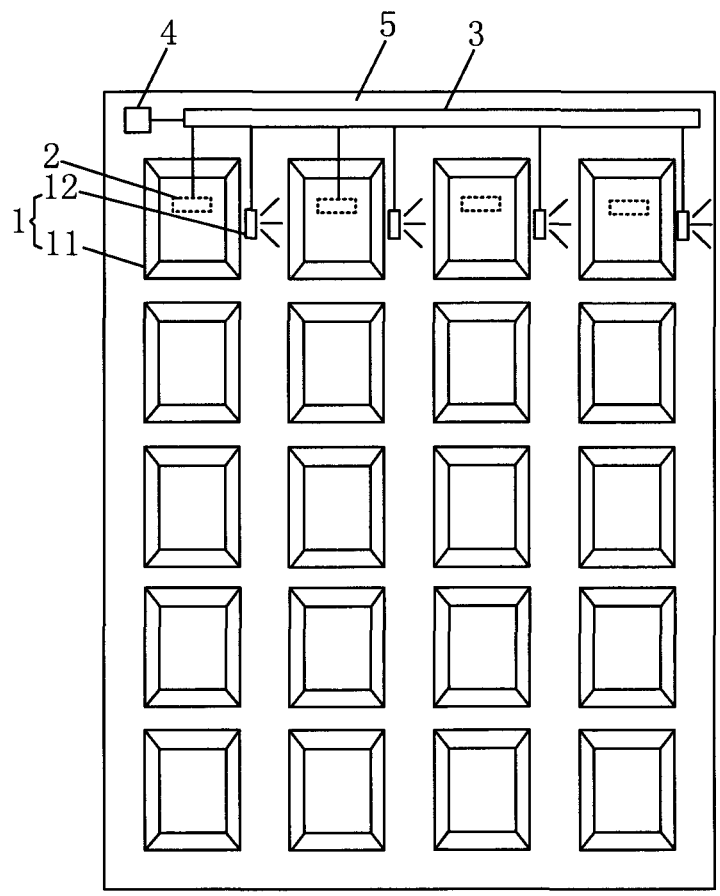
FIG. 3 is a structural schematic view of an input device provided by at least one embodiment of the present disclosure.

FIG. 3 is a structural schematic view of an input device provided by another embodiment of the present disclosure. As shown in FIG. 3, this embodiment and the above embodiment of FIG. 1 differ in that the light emitting source 12 is beside the key 11, and the light emitted from the light emitting source 12 is emitted from the slit adjacent to key 11.

For the description of the other structures in the input device, reference may be made to the above embodiment of FIG. 1, and it is not repeated here.

In the input device provided by this embodiment, the sensing device senses a tapping frequency corresponding to a light emitting key, and the data processing device generates a corresponding color control signal according to the tapping frequency; the light key emits light according to the color control signal, so that the input device achieves the effect of indicating the tapping frequency by the color control signal, thus making the input device realize indicating the health state to the user. Meanwhile, each light emitting key emits light according to the color control signal, so that the entire input device forms a comprehensive color light emitting effect, achieving a good visual effect and increasing the interest of tapping. The light emitting keyboard may also adjust the light emitting intensity according to the ambient light, thus facilitating reduction of power consumption.

Figure 4:
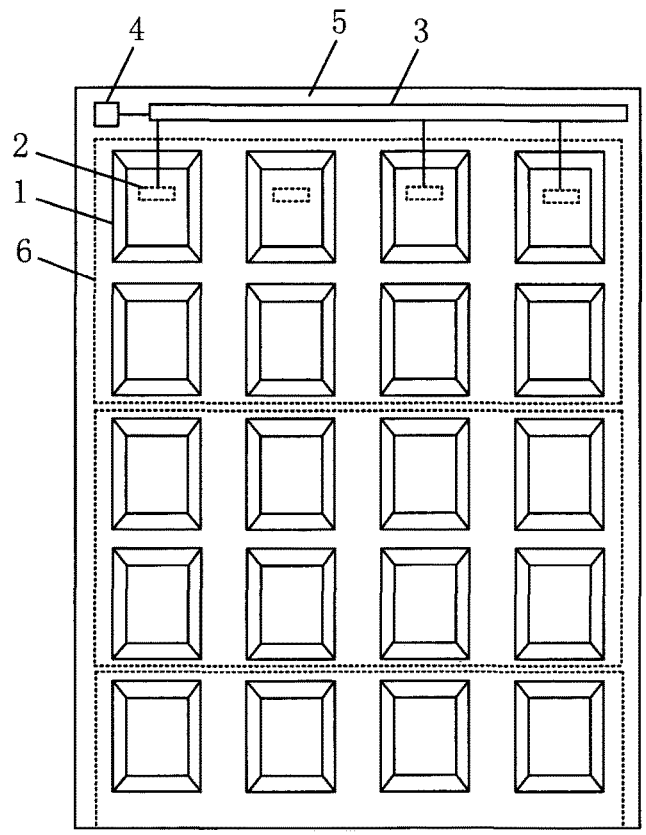
FIG. 4 is a structural schematic view of an input device provided by at least one embodiment of the present disclosure.

FIG. 4 is a structural schematic view of an input device provided by another embodiment of the present disclosure. As shown in FIG. 4, one sensing device 2 corresponds to one sensing region 6, and each sensing region 6 includes a plurality of light emitting keys 1. The sensing device 2 is specifically operable to sense the tapping frequency of the corresponding sensing region 6, and to send the tapping frequency to the data processing device 3. The data processing device 3 is operable to generate a color control signal corresponding to the sensing region 6 according to the tapping frequency of the sensing region; the light emitting keys 1 are specifically operable to emit light according to the color control signal corresponding to the sensing region 6 where the light emitting keys 1 are located.

In some implementations, the sensing device 2 may be a tapping sensing device, in which case the sensing device 2 may count the number of tapping times of the sensing region, and calculate an average value of the number of tapping times of each light emitting key 1 according to the number of tapping times of the sensing region 6 and the number of light emitting keys 1 in the sensing region 6. The sensing device 2 may then generate a tapping frequency according to the average value of the number of tapping times, with the tapping frequency being the tapping frequency corresponding to each of the light emitting keys 1 in the sensing region 6, wherein the average value of the number of tapping times may be equal to a value obtained by dividing the number of tapping times of the sensing region 6 by the number of light emitting keys 1 in the sensing region 6.

In some implementations, the sensing device may be an image identification device, in which case, the sensing device may count the number of tapping times in the sensing region by identifying the tapping actions of the user, and calculate an average value of the number of tapping times of each light emitting key according to the number of tapping times of the sensing region and the number of light emitting keys in the sensing region, and then generate a tapping frequency according to the average value of the number of tapping times, with the tapping frequency being the tapping frequency corresponding to each light emitting key in the sensing region, wherein the average value of the number of the tapping times is equal to a value obtained by dividing the number of tapping times of sensing region by the number of light emitting keys 1 in the sensing region, which is not depicted specifically in the drawing.

The structures in the input device may adopt the structures in the above embodiments of FIG. 1, 2, or 3, and are not repeated here.

In the input device provided by this embodiment, the sensing device senses a tapping frequency corresponding to a light emitting key, and the data processing device generates a corresponding color control signal according to the tapping frequency; the light emitting key emits light according to the color control signal, so that the input device achieves the effect of indicating the tapping frequency by the color control signal, making the input device realize indicating the health state to the user. Meanwhile, each light emitting key emits light according to the color control signal, so that the entire input device forms a comprehensive light emitting effect, achieving a good visual effect and increasing the interest of tapping. The light emitting keyboard may further adjust the light emitting intensity according to the ambient light, thus facilitating reduction of power consumption.

Another embodiment of the present disclosure provides an input device, which includes at least one light emitting key and a sensing device corresponding to the light emitting key. The sensing device is operable to sense a tapping frequency corresponding to the light emitting key, and to send the tapping frequency to a data processing device. The data processing device 3 is operable to generate a corresponding color control signal according to the tapping frequency. The light emitting key is operable to emit light according to the color control signal.

In this embodiment, the light emitting keys are virtual keys. Specifically, the light emitting keys may be projected onto an operation plane, e.g., a desktop.

In some implementations, one sensing device may correspond to all the light emitting keys, and the sensing device is for sensing the tapping frequency of each light emitting key. In some implementations, the sensing device may be an image identification device, which may count the number of tapping times by identifying the user's tapping actions and obtain the tapping frequency according to the number of tapping times, with the tapping frequency being the number of tapping times per second.

In some implementations, one sensing device corresponds to one sensing region, and each sensing region includes a plurality of light emitting keys. The sensing device is specifically operable to sense the tapping frequency of the corresponding sensing region, and to send the tapping frequency to the data processing device. The data processing device is operable to generate a color control signal corresponding to the region according to the tapping frequency of the sensing region. The light emitting keys are operable to emit light according to the color control signal corresponding to the sensing region where the light emitting keys are located. In some implementations, the sensing device may be an image identification device, in which case the sensing device may count the number of tapping times of the sensing region by identifying the tapping actions of the user, and calculate an average value of the number of tapping times of each light emitting key according to the number of tapping times and the number of the light emitting keys in the sensing region, and then generate a tapping frequency according to the average value of the number of tapping times, with the tapping frequency being the tapping frequency corresponding to each light emitting key in the sensing region. The average value of the number of tapping times may be equal to a value obtained by dividing the number of tapping times of the sensing region by the number of the light emitting keys in the sensing region.

In this embodiment, for a description of the data processing device, reference may be made to the description in the above embodiment of FIG. 1, and it is not repeated here.

In this embodiment, since the light emitting keys are virtual keys, when the light emitting keys are projected onto the operation plane, the projection device may directly project the light emitting keys as light emitting keys with the colors corresponding to the color control signals, so as to make the light emitting keys emit light according to the color control signals; or the projection device may directly project the light emitting keys as light emitting keys with the colors corresponding to the color control signals and the light intensities corresponding to the light intensity control signals according to the color control signals and the light intensity control signals.

In the input device provided by this embodiment, the sensing device senses a tapping frequency corresponding to a light emitting key, the data processing device generates a corresponding color control signal according to the tapping frequency, and the light emitting key emits light according to the color control signal, so that the input device achieves the effect of indicating the tapping frequency by the color control signal, thus making the input device realize indicating the health state to the user. Meanwhile, each light emitting key emits light according to the color control signal, so that the entire input device forms a comprehensive color light emitting effect, achieving a good visual effect and increasing the interest of tapping. The light emitting keyboard may also adjust the light emitting intensity according to the ambient light, thus facilitating reduction of power consumption.

Figure 5:
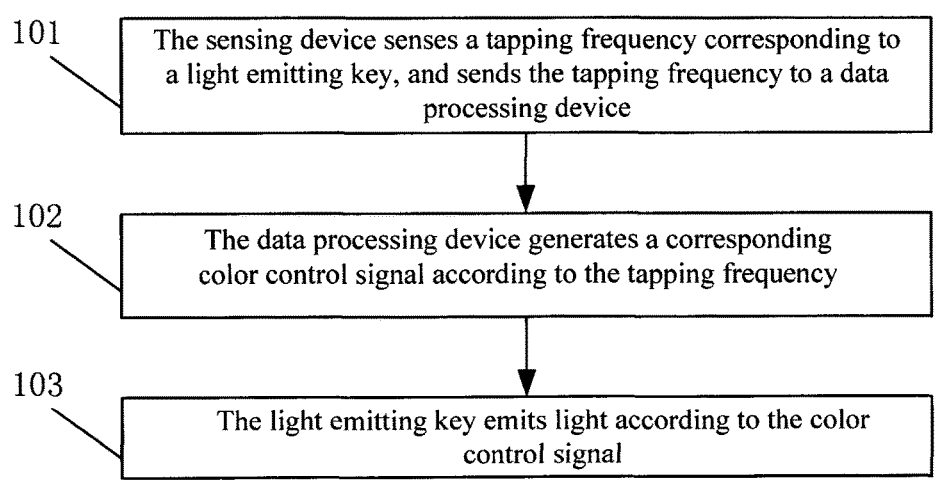
FIG. 5 is a flowchart of an input method provided by at least one embodiment of the present disclosure.

FIG. 5 is a flowchart of an input method provided by another embodiment of the present disclosure. As shown in FIG. 5, the method is based on the input device that includes at least one light emitting key and a sensing device corresponding to the light emitting key, and the method includes the following steps.

At step 101, the sensing device senses a tapping frequency corresponding to a light emitting key, and sends the tapping frequency to a data processing device.

At step 102, the data processing device generates a corresponding color control signal according to the tapping frequency.

This step may specifically include the data processing device looking up the color control signal corresponding to the tapping frequency from a preset first mapping relationship table, which includes a correspondence relationship between the tapping frequency and the color control signal.

At step 103, the light emitting key emits light according to the color control signal.

Further, the input device further includes a light sensing device, and the method further includes the following steps.

The light sensing device senses the ambient light to obtain the light intensity of the ambient light, and sends the light intensity of the ambient light to the data processing device.

The data processing device generates a corresponding light intensity control signal according to the light intensity of the ambient light. Specifically, the data processing device looks up the light intensity control signal corresponding to the light intensity of the ambient light from a preset second mapping relationship table, which includes a correspondence relationship between the light intensity of the ambient light and the light intensity control signal.

In this case, step 103 specifically includes that the light emitting key emits light according to the color control signal and the light intensity control signal.

The input method provided by this embodiment may be the operation method of the input device of any of the above embodiments. For a description of the input device, reference may be made to the above respective embodiments, and it is not repeated here.

In the input method provided by this embodiment, the sensing device senses a tapping frequency corresponding to a light emitting key, and the data processing device generates a corresponding color control signal according to the tapping frequency; the light emitting key emits light according to the color control signal, so that the input device achieves the effect of indicating the tapping frequency by the color control signal, thus making the input device realize indicating the health state to the user. Meanwhile, each light emitting key emits light according to the color control signal, so that the entire input device forms a comprehensive color light emitting effect, thus achieving a good visual effect and increasing the interest of tapping. The light emitting keyboard may further adjust the light intensity according to the ambient light, thus facilitating reduction of power consumption.

It is to be understood that the above embodiments are merely specific implementations of the present disclosure, and the present disclosure is not limited to these specific embodiments. For those of ordinary skill in the art, various changes and improvements may be made without departing from the spirit and essence of the present disclosure, and these changes and improvements are also considered to be within the protection scope of the present disclosure.

What is claimed is:

1. An input device, comprising:
   a plurality of light emitting keys, a plurality of sensing devices, and a light sensing device;
   wherein each sensing device corresponds to a respective sensing region, each sensing region comprising a plurality of light emitting keys,
   wherein each sensing device is operable to sense a tapping frequency of the corresponding sensing region, the tapping frequency corresponding to each light emitting key in the sensing region, and is further operable to send the tapping frequency to a data processing device, and the data processing device is operable to generate a corresponding color control signal according to the tapping frequency;
   wherein the light sensing device is operable to sense the ambient light to obtain a light intensity of the ambient light, and to send the light intensity of the ambient light to the data processing device, the data processing device is operable to generate a corresponding light intensity control signal according to the light intensity of the ambient light, and
   wherein the plurality of light emitting keys are operable to emit light according to the color control signal and the light intensity control signal.

2. The input device of claim 1, wherein each sensing device is operable to count the number of tapping times of the sensing region, to calculate an average value of the number of tapping times of each light emitting key according to the number of tapping times of the sensing region and the number of light emitting keys in the sensing region, and to generate a tapping frequency of the sensing region according to the average value of the number of tapping times.

3. The input device of claim 1, wherein the data processing device is operable to look up the color control signal corresponding to the tapping frequency from a preset first mapping relationship table, the first mapping relationship table comprising a correspondence relationship of the tapping frequency and the color control signal.

4. The input device of claim 1, wherein the data processing device is operable to look up the light intensity control signal corresponding to the light intensity of the ambient light from a preset second mapping relationship table, the second mapping relationship table comprising a correspondence relationship between the light intensity of the ambient light and the light intensity control signal.

5. The input device of claim 1, wherein the light emitting key is a physical key, and the input device comprises a main structure, and wherein the light emitting key is located in the main structure and comprises a key and a light emitting source.

6. The input device of claim 5, wherein the light emitting source is under the key, and the surface of the key is provided with a light emitting window, through which the light emitted by the light emitting source is emitted.

7. The input device of claim 5, wherein the sensing device is characterized by one of the following:
   (i) the sensing device is in the main structure and under the key, the sensing device being a tapping sensing device; and
   (ii) the sensing device is external to the main structure and above the key, the sensing device being an image identification device.

8. The input device of claim 5, wherein the data processing device is in the main structure.

9. The input device of claim 1, wherein the data processing device is in a computer connected to the input device.

10. The input device of claim 1, wherein the plurality of light emitting keys are a plurality of virtual keys.

11. The input device of claim 10, wherein the sensing device is one sensing device that corresponds to all the light emitting keys, and the one sensing device is operable to sense a tapping frequency of each of the light emitting keys.

12. The input device of claim 1, wherein the sensing device is one sensing device that corresponds to all the light emitting keys, such that the one sensing device is operable to sense a tapping frequency of each of the light emitting keys.

13. The input device of claim 5, wherein the light emitting source is one of under and beside the key, and the light emitted by the light emitting source is emitted from a slit adjacent to the key.

14. An input method, comprising:
   a sensing device sensing a tapping frequency corresponding to a sensing region, each sensing region comprising a plurality of light emitting keys, the tapping frequency corresponding to each light emitting key in the sensing region, and sending the tapping frequency to a data processing device;
   a light sensing device obtaining a light intensity of the ambient light by sensing the ambient light, and sending the light intensity of the ambient light to the data processing device; and
   the data processing device generating a corresponding color control signal according to the tapping frequency, and generating a corresponding light intensity signal according to the light intensity of the ambient light; and
   the light emitting key emitting light according to the color control signal and the light intensity control signal.

15. The input method of claim 14, wherein the data processing device generating a corresponding color control signal according to the tapping frequency comprises:

the data processing device looking up the color control signal corresponding to the tapping frequency from a preset first mapping relationship table, the first mapping relationship table comprising a correspondence relationship between the tapping frequency and the color control signal.

16. The input method of claim 14, wherein the data processing device generating a corresponding light intensity control signal according to the light intensity of the ambient light comprises:

the data processing device looking up the light intensity control signal corresponding to the light intensity of the ambient light from a second mapping relationship table, the second mapping relationship table comprising a correspondence relationship between the light intensity of the ambient light and the light intensity control signal.

\* \* \* \* \*